Patented July 28, 1953

2,647,100

UNITED STATES PATENT OFFICE 2,647,100

POLYVINYL ETHER ADHESIVE SUBSTANCE FOR PLASTER COATINGS AND METHOD OF MAKING THE SAME

Ferdinand Salditt, Neuwied (Rhine), Germany, assignor to The Scholl Mfg. Co. Inc., Chicago, Ill., a corporation of New York No Drawing. Application April 27, 1950, Serial No. 158,605. In Switzerland May 7, 1949

3 Claims. (Cl. 260—45.5)

The present invention relates to an adhesive tape provided with a porous adhesive surface. The invention also pertains to coating compositions which are useful in coating strip material to be used in the manufacture of adhesive tape having properties superior to any presently used adhesive tape.

The most commonly used adhesive tape on the market today consists of a mixture of natural rubber, resins, lanolin, and zinc oxide. The adhesive surfaces are ordinarily applied by pressing the adhesive composition onto a backing material such as cotton fabric, by means of a calender. Alternatively, the adhesive composition may first be dissolved in a suitable solvent, such as alcohol, to form a paste which is then spread on the backing material by suitable spreading apparatus.

The previously described methods for producing adhesive tapes have several inherent disadvantages. Where the adhesive substance is coated onto the backing material by means of calenders, the use of expensive and complex apparatus is required. Where the adhesive composition is deposited on the tape through the medium of a solvent, the expense of the large volumes of solvent required offers a serious drawback in this process.

The use of natural resinous compositions, as is done in preparing adhesive compositions for manufacturing adhesive tapes, also has a very serious disadvantage in that the adhesive causes irritation of the skin due to the presence of resin acids in the resinous material. For this reason, it is common to add zinc oxide to the coating composition in order to neutralize the irritant acids. The addition of zinc oxide, while beneficial in alleviating irritation which may be caused by the resin acids, itself may have a corrosive action on the open wound and skin which is to be covered by the adhesive tape. Irritation to the skin caused by prolonged contact of adhesive compositions with the skin has long been recognized as the cause of blistering and other skin afflictions. Such skin irritation has been greatly aggravated by the non-porous or air impervious adhesive tape in common use.

With the foregoing in mind, an object of the present invention is to provide a novel adhesive tape having an adhesive surface which is completely non-irritating to the skin.

Still another object of the present invention is to provide an adhesive tape having a porous adhesive surface.

Another object of the present invention is to provide a coating composition which can be easily applied without the use of expensive apparatus to the backing material in the manufacture of adhesive tape.

Yet another object of the invention is to provide coating compositions which are physiologically inactive toward open wounds and yet have adhesive properties surpassing those possessed by ordinary adhesive tapes containing resins and rubbers.

Another object of the present invention is to provide a method of making adhesive coating compositions and adhesive tapes.

The adhesive tape of the present invention is characterized by a homogeneous adhesive coating consisting of a relatively high molecular weight organic polymer dissolved in a liquid polymer of a lower degree of polymerization, and hence having a lower molecular weight than the relatively high molecular weight polymer.

In the preferred embodiment of the present invention, adhesive coating compositions are prepared by dissolving a normally solid polyvinyl alkyl ether in a liquid or liquefied polyvinyl alkyl ether of lower degree of polymerization than the high molecular weight compound.

Polyvinyl alkyl ethers have been prepared commercially through several different processes. One such process consists in passing acetylene into an alcohol containing a catalyst wherein an ether of the vinyl alcohol is formed. Such ethers polymerize readily on heating, and the polymerization is accelerated by the addition of organic peroxides. By controlling the temperatures of polymerization, polymers of varying molecular weight can be prepared and recovered.

The polyvinyl alkyl ethers of a relatively high degree of polymerization, for example, having a molecular weight in the vicinity of 100,000 or more, are rubber-like and have semi-elastic properties. The lower molecular weight polymers, having a molecular weight of less than about 50,000, are oily or are very soft resins which can be melted at slightly elevated temperatures, normally about 100° C.

One of the remarkable characteristics of such a solution of high molecular weight polymer in lower molecular weight polymer is that the adhesive and rubber-like properties of the highly polymerized component are permanently conserved in solution in the lower molecular weight polymer. The adhesive film which is formed is remarkably stable and non-irritant to the skin.

Another important characteristic of the adhesive films thus produced is that they can be set onto the backing of cotton gauze or other material by means of a rapid chilling to give a porous, and yet completely adhesive coating. The porosity of the coating enables the underlying skin surfaces to have access to air and thus inhibit the formation of blisters or other skin afflictions even after prolonged contact between the adhesive and the skin.

The solvent for the high molecular weight polymer may consist of a polymer of the same chemical structure as the rubber-like high polymer, or may consist of a relatively low molecular weight polymer of a material of closely analogous chemical structure. For example, a high molecular weight polyvinyl isobutyl ether polymer may suitably be dissolved in low molecular weight polyvinyl isobutyl ether, or polyvinyl ethyl ether, or mixtures of the two. The only requirement to be met is that the highly polymerized rubber-like polymer should readily dissolve at slightly elevated temperatures in the less highly polymerized, oily lower molecular weight polymer.

The proportions of high polymer to low polymer may be varied within wide ranges within the practice of the present invention. However, I prefer to use about 1 part by weight high polymer to 1 to 7 parts by weight of the relatively low molecular weight polymer. Coating compositions having such proportions have been found to be permanently adhesive and non-irritating to the skin. The adhesive coatings produced are also substantially uniformly porous.

The relative proportions to be employed in the adhesive compositions including the high and low molecular weight polymers, together with the filler material, may also be varied over a substantial range. In general, however, the best compositions are prepared by using from 10% to 40% by weight of high polymer in the mass, and preferably, 20% to 30%. The low polymer may be present in amounts from 25% to 70% by weight of the ultimate composition, and preferably from 35% to 55% by weight of the mass. The remainder of the composition, of course, may constitute inert fillers or pigments of any type and composition.

Another feature of the present invention resides in the fact that pigments can be employed in the adhesive composition which exhibit a more brilliant white color than conventional zinc oxide-containing adhesive coatings. For example, titanium oxide, which is used extensively as a pigment for white paint and which has a particularly brilliant white color, may be incorporated within the adhesive composition. By the same token the entire bandage may be given a flesh color to decrease its visibility if worn in an exposed location.

In addition to the pigments, the adhesive compositions of the present invention may also include commonly used materials such as lanolin, talc, and the like.

The adhesive compositions of the present invention are easily prepared and easily applied to the backing surface. In general, the compositions are prepared by melting a soft resin, for example, a polyvinyl isobutyl ether having a molecular weight of less than about 50,000 at a slightly elevated temperature on the order of 100° C. To the liquid polymer is added a normally solid, rubber-like high molecular weight polymer, for example, a polyvinyl isobutyl ether having a molecular weight of about 100,000 or more. I have found that such polymers are readily soluble in the lower molecular weight polymers at temperatures slightly above the melting point of the lower polymers. The two types of polymers are mixed together and a pigment, such as titanium oxide, may be added during such mixing. The mixture results in a homogeneous paste which may be coated onto the backing material, such as cotton fabric, at a temperature substantially the same as the mixing temperature.

The following specific examples illustrate the preparation of several coating compositions and adhesive tapes of the present invention:

Example I 44 parts of a polyvinyl isobutyl ether having a molecular weight of about 45,000 were melted to an oily liquid by heating to a temperature of about 100° C. To this heated mass were added 28 parts by weight of a more highly polymerized polyvinyl isobutyl ether having a molecular weight of about 120,000. This high molecular weight polymer is normally solid and has semi-elastic properties. At the mixing temperature of about 100° C., the high molecular weight polymer was readily soluble in the lower polymer. The mixing temperature was maintained constant while 15 parts by weight titanium oxide were added, and the mixture stirred. The resulting composition was a homogeneous paste. This paste was then coated on a tape backing material while maintaining the temperature in the vicinity of 100° C. The opposite side of the backing material was maintained at a temperature substantially lower than the temperature of the composition, thereby causing a quick chilling of the composition into a porous adhesive mass. The product was a porous adhesive strip possessing very high adhesive properties and stable to air, while at the same time causing no irritation of the skin.

Example II 30 parts by weight of polyvinyl isobutyl ether having a molecular weight of about 40,000 was melted to an oily liquid by heating to a temperature of 110° C. While maintaining the liquid polymer at this temperature, 25 parts by weight of polyvinyl isobutyl ether of a molecular weight of about 105,000 were added and dissolved completely. To the homogeneous solution thus prepared were added 15 parts by weight of a polyvinyl ethyl ether having a molecular weight of about 35,000. The latter polymer is a soft resinous product which melts below the mixing temperature. The mass was continually stirred while keeping the temperature at 110° C., and a filler comprising 5 parts by weight of lanolin and 15 parts by weight of talc were added. The mass was then ready for spreading on a suitable tape-like backing.

Example III 30 parts by weight of polyvinyl secondary butyl ether having a molecular weight of about 40,000 were employed as a solvent in place of the polyvinyl isobutyl ether of Example II. The other components were added in the same proportions and under the same conditions as given in Example II. The resulting coating composition was extremely homogeneous and possessed excellent adhesive properties.

From the foregoing, it will be apparent that the novel adhesive tapes of the present invention, being porous and non-irritant to the skin, have substantial advantages over the adhesive tapes now commonly used. The coating compositions used in preparing the adhesive tapes have the advantages of ease of application, ease of manufacture, and inherent stability. The compositions of the present invention obviate the necessity of incorporating zinc oxide into such adhesive compositions, and also have the advantage that the use of relatively expensive solvents is dispensed with in their preparation, thus providing the additional desideratum of very economical manufacture.

It will be understood that modifications and variations may be effected without departing from the scope of the novel concepts of the present invention.

I claim as my invention:

1. A method of preparing an adhesive coating composition, which comprises providing a relatively low molecular weight polymer of a polyvinyl alkyl ether at a temperature sufficient to liquefy the same; and dissolving in said liquefied polymer, while it is maintained at said temperature, a relatively high molecular weight polymer of a polyvinyl alkyl ether that is normally solid at said temperature.

2. A method of preparing an adhesive coating composition, which comprises heating a relatively low molecular weight polymer of a polyvinyl alkyl ether to a temperature sufficient to liquefy the same, said polymer having a molecular weight below 50,000; and while maintaining said polymer at said temperature in a liquefied state, dissolving therein a relatively high molecular weight polymer of a polyvinyl alkyl ether having a molecular weight of at least 100,000.

3. A method of preparing an adhesive coating composition, which comprises heating a first polyvinyl isobutyl ether of 40,000 molecular weight to about 100° C. to liquefy the same; and while said first polyvinyl isobutyl ether is maintained in a liquid state, admixing therewith and dissolving therein a second polyvinyl isobutyl ether of at least 100,000 molecular weight, and weight ratio of the first to the second polyvinyl isobutyl ether being 25–70 to 10–40.

FERDINAND SALDITT.

References Cited in the file of this patent

UNITED STATES PATENTS

| Number | Name | Date |
|---|---|---|
| 2,072,465 | Reppe et al. | Mar. 2, 1937 |
| 2,117,199 | Miller | May 10, 1938 |
| 2,349,508 | Mack | May 23, 1944 |
| 2,415,901 | Nelson et al. | Feb. 18, 1947 |
| 2,421,640 | New et al. | June 3, 1947 |
| 2,444,830 | Kellgren et al. | July 6, 1948 |
| 2,498,338 | Martin | Feb. 21, 1950 |

FOREIGN PATENTS

| Number | Country | Date |
|---|---|---|
| 705,104 | Germany | Apr. 17, 1941 |
| 891,493 | France | Dec. 11, 1943 |